US011203313B2

(12) United States Patent
Momii

(10) Patent No.: US 11,203,313 B2
(45) Date of Patent: Dec. 21, 2021

(54) SENSOR ATTACHMENT STRUCTURE AND MOVING BODY

(71) Applicant: HONDA MOTOR CO., LTD., Tokyo (JP)

(72) Inventor: Motoyuki Momii, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/201,062

(22) Filed: Mar. 15, 2021

(65) Prior Publication Data

US 2021/0291767 A1 Sep. 23, 2021

(30) Foreign Application Priority Data

Mar. 19, 2020 (JP) .............................. JP2020-048910

(51) Int. Cl.
*G01D 11/30* (2006.01)
*B60R 19/48* (2006.01)
*G01D 11/24* (2006.01)

(52) U.S. Cl.
CPC .......... *B60R 19/483* (2013.01); *G01D 11/245* (2013.01); *G01D 11/30* (2013.01)

(58) Field of Classification Search
CPC ..... B60R 19/483; G01D 11/245; G01D 11/30
See application file for complete search history.

(56) References Cited

U.S. PATENT DOCUMENTS

| 9,964,641 | B2* | 5/2018 | Watanabe | ............. | G01S 13/931 |
| 2020/0262376 | A1* | 8/2020 | Aizawa | ................. | B60R 19/483 |
| 2021/0031701 | A1* | 2/2021 | Kitagawa | ................ | B60R 11/02 |

FOREIGN PATENT DOCUMENTS

JP 2016-121927 A 7/2016

* cited by examiner

*Primary Examiner* — Jamel E Williams
(74) *Attorney, Agent, or Firm* — Westerman, Hattori, Daniels & Adrian, LLP

(57) ABSTRACT

A sensor attachment structure in which a sensor bracket that holds a sensor configured to detect an external world of a moving body is attached to an exterior member of the moving body and a structure member of the moving body, comprises: a first absorption mechanism configured to hold the sensor bracket such that the sensor bracket can retreat from an initial position of the sensor bracket in a state in which an external load does not act along a front-and-rear direction of the moving body in response to action of the external load; and a second absorption mechanism configured to hold the sensor bracket such that the sensor bracket can swing from the initial position in response to the action of the external load, while being held by the first absorption mechanism.

10 Claims, 6 Drawing Sheets

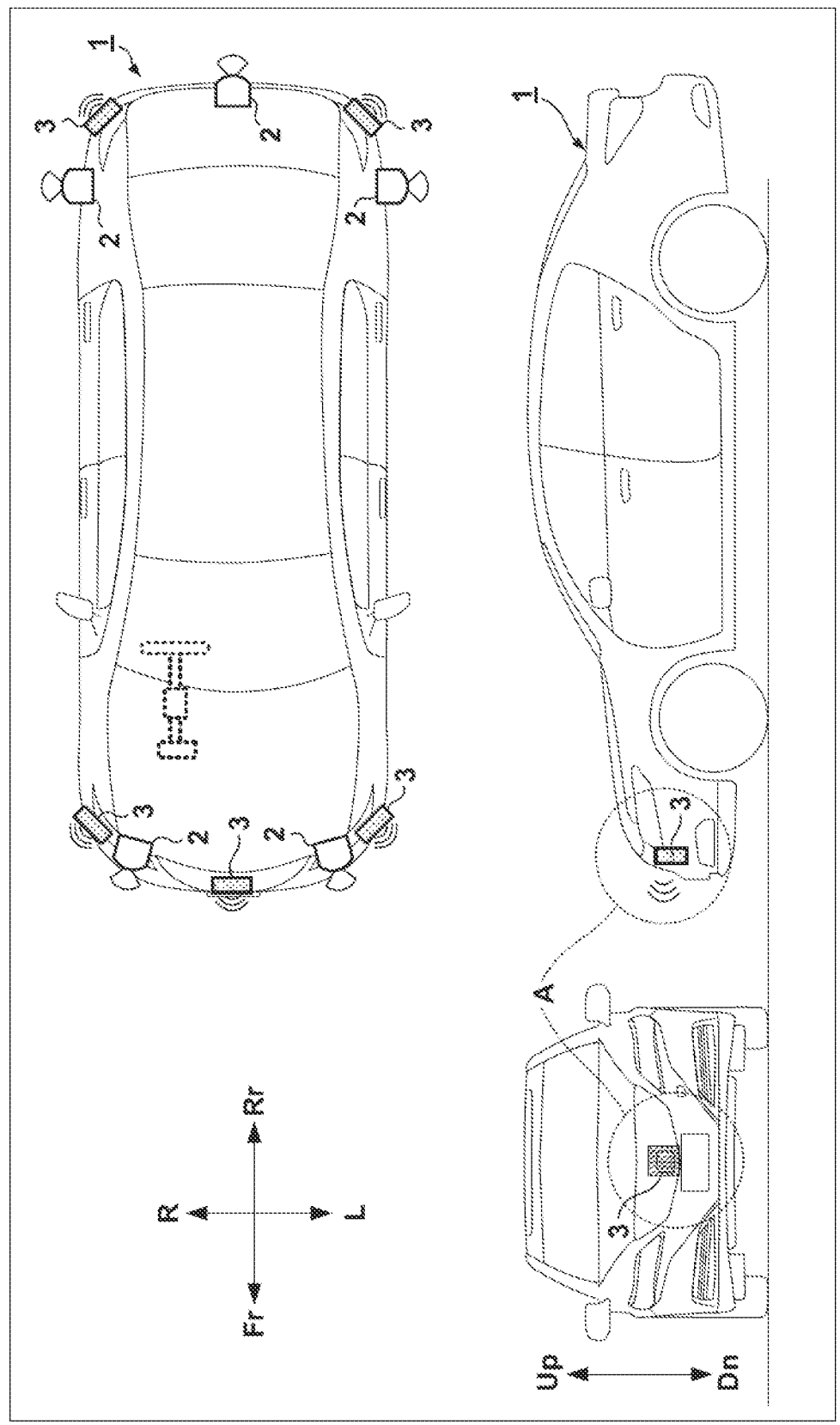

SENSOR ATTACHMENT STRUCTURE AND MOVING BODY

This application claims priority to and the benefit of Japanese Patent Application No. 2020-048910 filed on Mar. 19, 2020, the entire disclosure of which is incorporated herein by reference.

BACKGROUND OF THE INVENTION

Field of the Invention

The present invention relates to a sensor attachment structure of a sensor configured to detect external world information, and a moving body.

Description of the Related Art

Japanese Patent Laid-Open No. 2016-121927 discloses a structure in which an object detection device including a sensor configured to detect external world information of a vehicle and a support member that supports the sensor are fixed to the floor body member of a vehicle body.

If a sensor is attached to the exterior member of a vehicle to extend the detection range of the sensor, the sensor needs to be protected from a load that the exterior member receives. Also, the attachment accuracy of the sensor may change due to aging caused by the influence of a weight that the exterior member receives.

The present invention has been made in consideration of the above-described problem, and provides a sensor attachment structure that protects a sensor by absorbing a load that an exterior member receives without being influenced by a change in the attachment accuracy caused by aging.

SUMMARY OF THE INVENTION

According to one aspect of the present invention, there is provided (a sensor attachment structure in which a sensor bracket that holds a sensor configured to detect an external world of a moving body is attached to an exterior member of the moving body and a structure member of the moving body, comprising:

a first absorption mechanism configured to hold the sensor bracket such that the sensor bracket can retreat from an initial position of the sensor bracket in a state in which an external load does not act along a front-and-rear direction of the moving body in response to action of the external load; and a second absorption mechanism configured to hold the sensor bracket such that the sensor bracket can swing from the initial position in response to the action of the external load, while being held by the first absorption mechanism.

According to the present invention, it is possible to provide a sensor attachment structure that protects a sensor by absorbing a load that an exterior member receives without being influenced by a change in the attachment accuracy caused by aging. Hence, even if a sensor bracket is attached to both the exterior member of a moving body and the structure member of the moving body, the impact of an external load can be absorbed by retreat and swing of the sensor bracket. It is therefore possible to suppress damage to the sensor and protect it.

BRIEF DESCRIPTION OF THE DRAWINGS

FIG. 1B is a view showing an example of the arrangement of sensors configured to detect external world information of a vehicle;

DESCRIPTION OF THE EMBODIMENTS

Figure 1A:
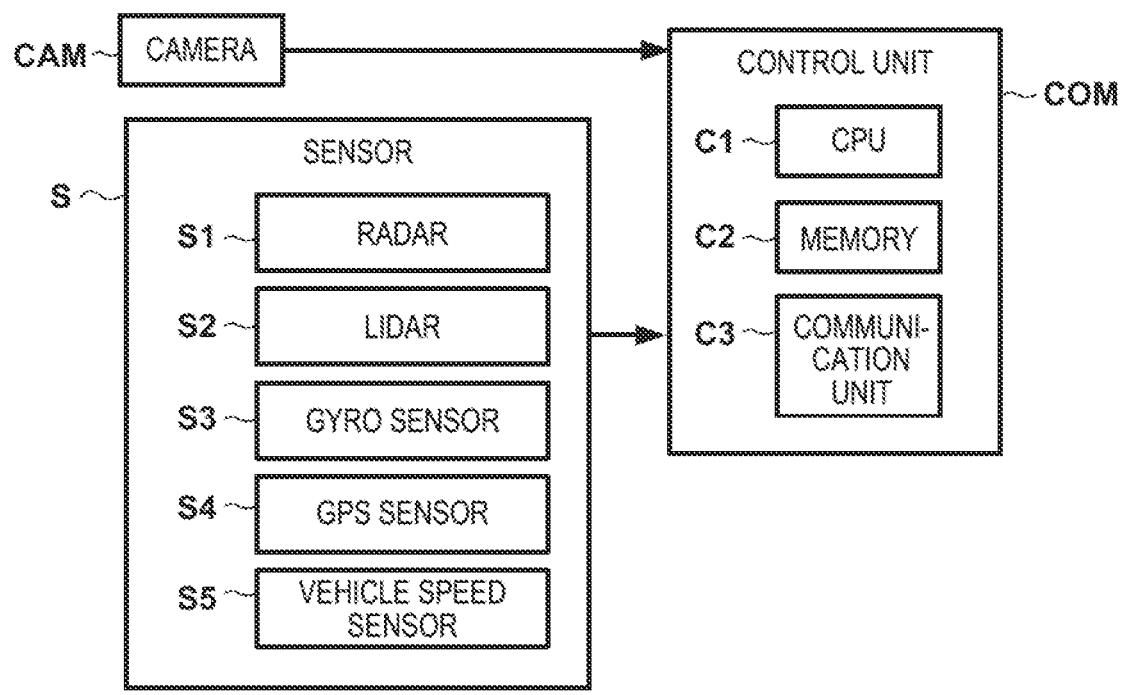
FIG. 1A is a block diagram showing the basic arrangement of a vehicle control apparatus.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

FIG. 1A is a block diagram showing the basic arrangement of a vehicle control apparatus that performs automated driving control of a moving body (to be also referred to as a "vehicle" hereinafter). The vehicle control apparatus includes a sensor S, a plurality of cameras CAM, and a computer COM. The sensor S includes, for example, a plurality of radars S1, a plurality of LiDARs S2 (Light Detection and Ranging), a gyro sensor S3, a GPS sensor S4, and a vehicle speed sensor S5. The sensor S and the camera CAM acquire the information of the vehicle and various kinds of information around the vehicle and input the acquired information to the control unit COM.

The control unit COM includes a CPU C1 that controls processing concerning automated driving control of the vehicle, a memory C2, a communication unit C3 capable of communicating with a server on a network or an external device, and the like. The control unit COM performs image processing for the information input from the sensor S (the radars S1 and the LiDARs S2) and the camera CAM, extracts a target (object) existing around the self-vehicle, analyzes what kind of target is arranged around the self-vehicle, and monitors the target.

The gyro sensor S3 detects the rotational motion and the posture of the self-vehicle, and the control unit COM can determine the course of the self-vehicle based on the detection result of the gyro sensor S3 or a vehicle speed detected by the vehicle speed sensor S5. The control unit COM can perform automated driving control of the vehicle based on the information input from the sensor S and the camera CAM.

FIG. 1B is a view showing an example of the arrangement of the sensors S configured to detect the external world information of a vehicle 1. In FIG. 1B, as an example, the vehicle 1 is a sedan-type four-wheeled passenger car. As the sensors S configured to detect the external world information of the vehicle 1, sensors 2 (LiDAR detection units) configured to detect an object around the vehicle 1 by light, and sensors 3 (radar detection units) configured to detect an object around the vehicle 1 by radio waves are arranged on the vehicle 1. As shown in FIG. 1B, the sensors 2 (LiDAR detection units) are arranged at the corners of the front portion of the vehicle 1, on both sides of the rear portion, and at the center of the rear portion. The sensors 3 (radar detection units) are arranged at the center of the front portion of the vehicle 1, at the corners of the front portion of the vehicle 1, and at the corners of the rear portion of the vehicle 1.

As a sensor attachment structure according to this embodiment, the attachment structure of the sensor 3 (radar detection unit) arranged at the center of the front portion of the vehicle 1 as a detection unit configured to detect the external world information of the vehicle 1 will be described. Referring to FIG. 1B, "front (Fr)", "rear (Rr)", "left (L)", and "right (R)" comply with directions viewed from the driver. The direction extending from front (Fr) to rear (Rr) will be referred to as the front-and-rear direction of the vehicle 1, and the direction of left (L) or right (R) will be referred to as the left-and-right direction, the width direction, or the vehicle width direction. In addition, the direction of up (Up) or down (Dn) will be referred to as the up-and-down direction of the vehicle 1.

<Sensor Attachment Structure>

Figure 2:
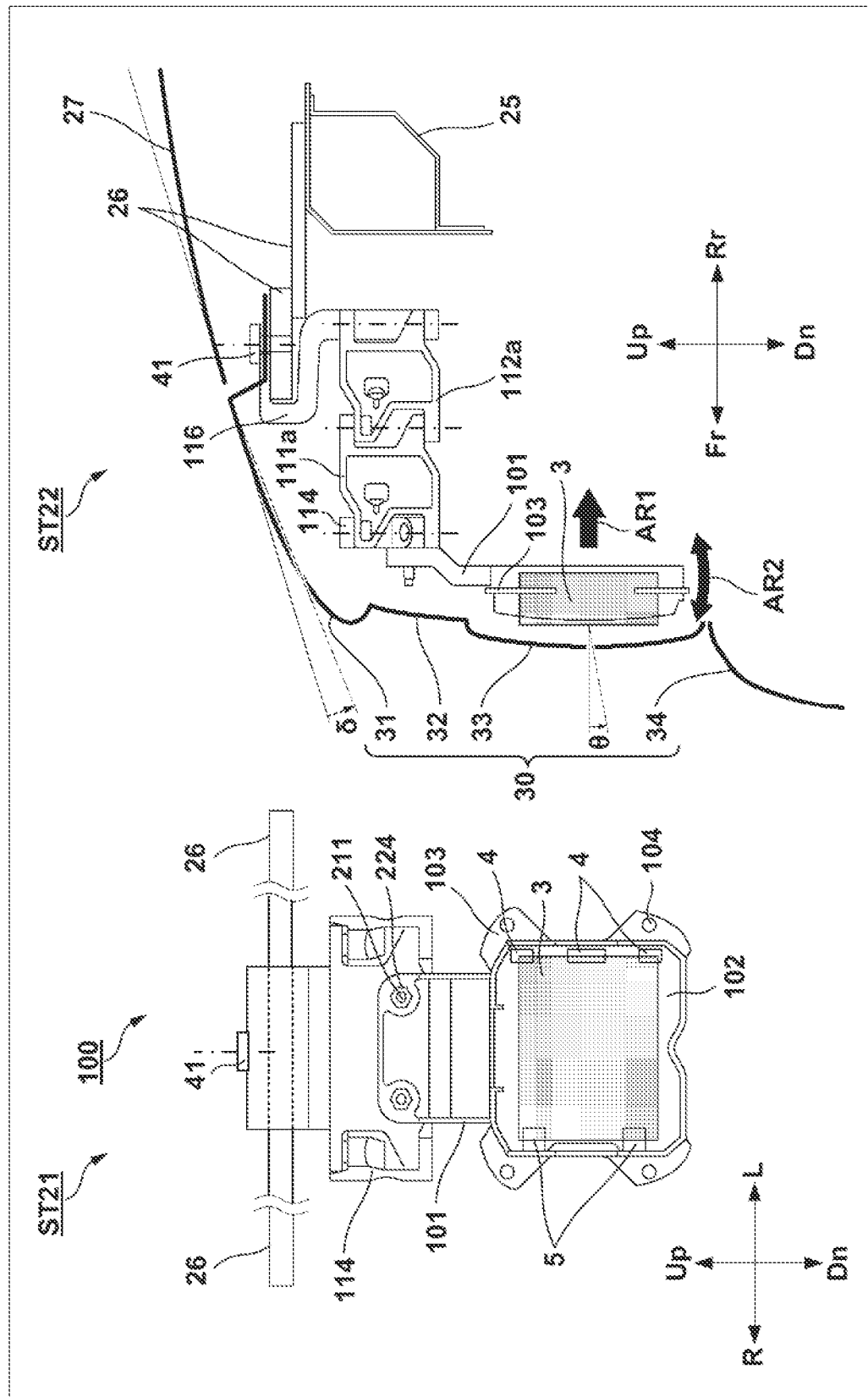
FIG. 2 is a view showing a sensor attachment structure in a portion A shown in FIG. 1B.

FIG. 2 is a view showing a sensor attachment structure 100 of the sensor 3 in a portion A shown in FIG. 1B. ST21 in FIG. 2 is a view showing a state in which the sensor attachment structure 100 is viewed from the front of the vehicle 1, and ST22 is a view showing a state in which the sensor attachment structure 100 is viewed from a side of the front portion of the vehicle 1.

In ST22, a front bulkhead 25 that forms the structure member (to be also referred to as a "vehicle body structure member" hereinafter) of the vehicle 1 has a hollow closed sectional structure with an almost rectangular section. As a member that forms the vehicle body structure member of the vehicle 1, an upper beam 26 extending in the front-and-rear direction of the vehicle 1 is connected to the upper portion of the front bulkhead 25. The vehicle 1 includes a hood 27 on the upper side of the upper beam 26.

Also, the vehicle 1 includes, as an exterior member 30, an upper bumper 31, a grille 32, an emblem 33, and a lower bumper 34. The upper bumper 31 is connected to the upper beam 26 (vehicle body structure member) by a fastening member 41. The grille 32 is formed on the lower side of the upper bumper 31, takes outside air from the front end portion of the vehicle 1, and guides the outside air to a radiator (not shown). In the grille 32, a plurality of air guide plates each having an almost plate shape and extending in the vehicle width direction are juxtaposed in the up-and-down direction at a predetermined interval. The lower bumper 34 is formed on the lower side of the emblem 33 and arranged at the front edge of the vehicle 1.

The emblem 33 is formed on the lower side of the grille 32, and a concave portion to which a sensor bracket 101 can be attached is formed on the back surface side of the emblem 33 (on the rear side of the vehicle 1).

For example, as shown in ST21 of FIG. 2, an attachment portion 102 of the sensor bracket 101 is provided with engaging portions 4 and 5 used to attach the sensor 3. Each of the engaging portions 4 and 5 is a plate-shaped member projecting from the planar portion of the attachment portion 102 to the front side of the vehicle. The end portion of each of the engaging portions 4 and 5 has a sectional shape bent into an almost L shape and is formed apart from the planar portion of the attachment portion 102. When attaching the sensor 3, for example, the sensor 3 is obliquely inserted into the gap between the end portions of the engaging portions 4 on one side and the planar portion of the attachment portion 102, thereby making a side surface of the sensor 3 abut against the two engaging portions 4. Using the abutting side surface of the sensor 3 as a positioning reference, the sensor 3 is made to pivot to the rear side of the vehicle, thereby fitting the other side surface of the sensor 3 into the gap between the end portions of the engaging portions 5 on the other side and the planar portion of the attachment portion 102. By the pivot attachment structure using the elastic deformation of the engaging portions 4 and 5, the sensor 3 is attached to the attachment portion 102 of the sensor bracket 101. In ST21 and ST22 of FIG. 2, a hatched portion represents the sensor 3 attached to the attachment portion 102.

Attachment flanges 103 are formed at the four corners of the attachment portion 102 of the sensor bracket 101. When screws are inserted into opening portions 104 formed in the attachment flanges 103, and the attachment flanges 103 are screwed by a fastening method such as tapping, the sensor bracket 101 is attached to the exterior member (the back surface side of the emblem 33). In the example shown in FIG. 2, the sensor bracket 101 is attached to the back surface side of the emblem 33. However, the present invention is not limited to this example, and any portion of the exterior member 30 can be used.

If the sensor bracket 101 is attached to only the exterior member, as in a conventional technique, the attachment position of the exterior member may be changed by aging caused by the influence of a weight that the exterior member receives. For example, as shown in ST22 of FIG. 2, if the attachment position of the upper bumper 31 moves downward by a displacement amount δ, the irradiation axis of the sensor 3 attached to the attachment portion 102 of the sensor bracket 101 shifts by θ.

To prevent the influence of the change in attachment accuracy caused by aging, in this embodiment, a fixing member 116 of the sensor attachment structure 100 is fixed to the upper beam 26 (vehicle body structure member) together with the upper bumper 31 by the fastening member 41. That is, in the sensor attachment structure 100 according to this embodiment, the sensor bracket 101 that holds the sensor 3 (radar detection unit) configured to detect the external world of the vehicle 1 is attached to the exterior member 30 of the vehicle 1 and the vehicle body structure member (the upper beam 26 and the front bulkhead 25) of the vehicle 1. When the sensor bracket 101 is attached to both the exterior member 30 and the vehicle body structure member (the upper beam 26 and the front bulkhead 25) of the vehicle 1, it is possible to reduce the influence of aging caused by the influence of the weight that the exterior member 30 receives and suppress the change in the attachment accuracy of the detection unit.

The sensor attachment structure 100 according to this embodiment includes a first absorption mechanism 110 and a second absorption mechanism 210 as absorption mechanisms configured to absorb an external load. The structure of each absorption mechanism will be described below in detail.

<First Absorption Mechanism>

Figure 3:
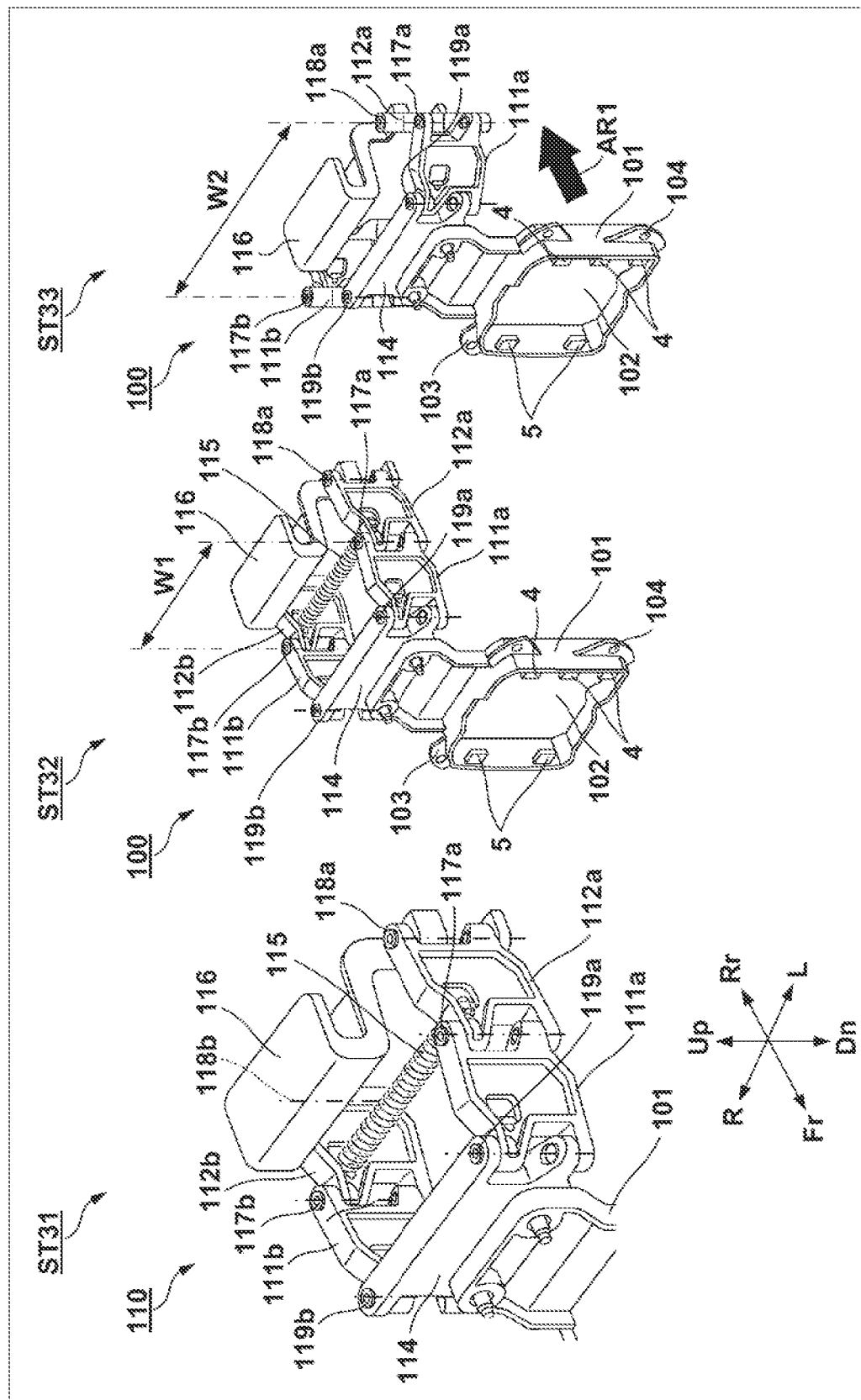
FIG. 3 is a view for explaining the structure and the operation of a first absorption mechanism.

FIG. 3 is a view for explaining the structure and the operation of the first absorption mechanism 110. ST31 is a view showing the entire first absorption mechanism 110, and ST32 is a view showing the sensor attachment structure 100 in a state (initial position) in which an external load does not act. In addition, ST33 is a view showing the operation of the first absorption mechanism 110 in a case in which an external load F acts on the sensor attachment structure 100.

The first absorption mechanism 110 is provided between the sensor bracket 101 and the vehicle body structure member (the upper beam 26 and the front bulkhead 25). The first absorption mechanism 110 holds the sensor bracket 101 such that the sensor bracket 101 can retreat from the initial position of the sensor bracket 101 in a state in which an external load does not act (ST32) along the front-and-rear direction (the direction of an arrow AR1 in FIGS. 2 and 3) of the vehicle 1 in response to the action of an external load.

As shown in ST31, the first absorption mechanism 110 includes a plurality of first links 111a and 111b that support a bracket connecting member 114 connectable to the sensor bracket 101, and a plurality of second links 112a and 112b that support the plurality of first links 111a and 111b. In addition, the first absorption mechanism 110 includes a plurality of connecting pins 117a and 117b (first connecting members) that pivotally connect the plurality of first links 111a and 111b to the plurality of second links 112a and 112b, and a plurality of connecting pins 118a and 118b (second connecting members) that pivotally connect the plurality of second links 112a and 112b to the fixing member 116 fixed to the vehicle body structure member (the upper beam 26 and the front bulkhead 25). Also, the first absorption mechanism 110 includes a plurality of connecting pins 119a and 119b (third connecting members) that pivotally connect the plurality of first links 111a and 111b to the bracket connecting member 114, and a spring 115 (first elastic member) provided between the plurality of second links 112a and 112b. Note that the position of the spring 115 (first elastic member) is not limited to the position between the plurality of second links 112a and 112b, and the spring 115 may be arranged between the plurality of first links 111a and 111b. Alternatively, the spring 115 may be provided between the plurality of first links 111a and 111b and between the plurality of second links 112a and 112b. That is, the spring 115 (first elastic member) is provided at at least one of the position between the plurality of first links 111a and 111b and the position between the plurality of second links 112a and 112b.

As shown in ST32, at the initial position, the spring 115 (first elastic member) biases such that an interval W1 between the plurality of connecting pins 117a and 117b (first connecting members) in the vehicle width direction of the vehicle is held by the restoring force of the spring 115 (first elastic member). As shown in ST33, if the external load F acts, the plurality of first links 111a and 111b and the plurality of second links 112a and 112b pivot to extend the interval W1 between the connecting pins 117a and 117b to an interval W2 (W2>W1) in response to the action of the external load F and make the sensor bracket 101 retreat from the initial position to the rear side of the vehicle 1, thereby absorbing the external load F. If the action of the external load F is canceled, the plurality of first links 111a and 111b and the plurality of second links 112a and 112b are returned from the retreat state in ST33 to the positions in the initial state in ST32 by the restoring force of the spring 115 (first elastic member). The sensor bracket 101 is returned to the position in the initial state in ST32. This makes it possible to continuously use the sensor 3 without performing an adjusting operation such axis adjustment.

<Second Absorption Mechanism>

Figure 4:
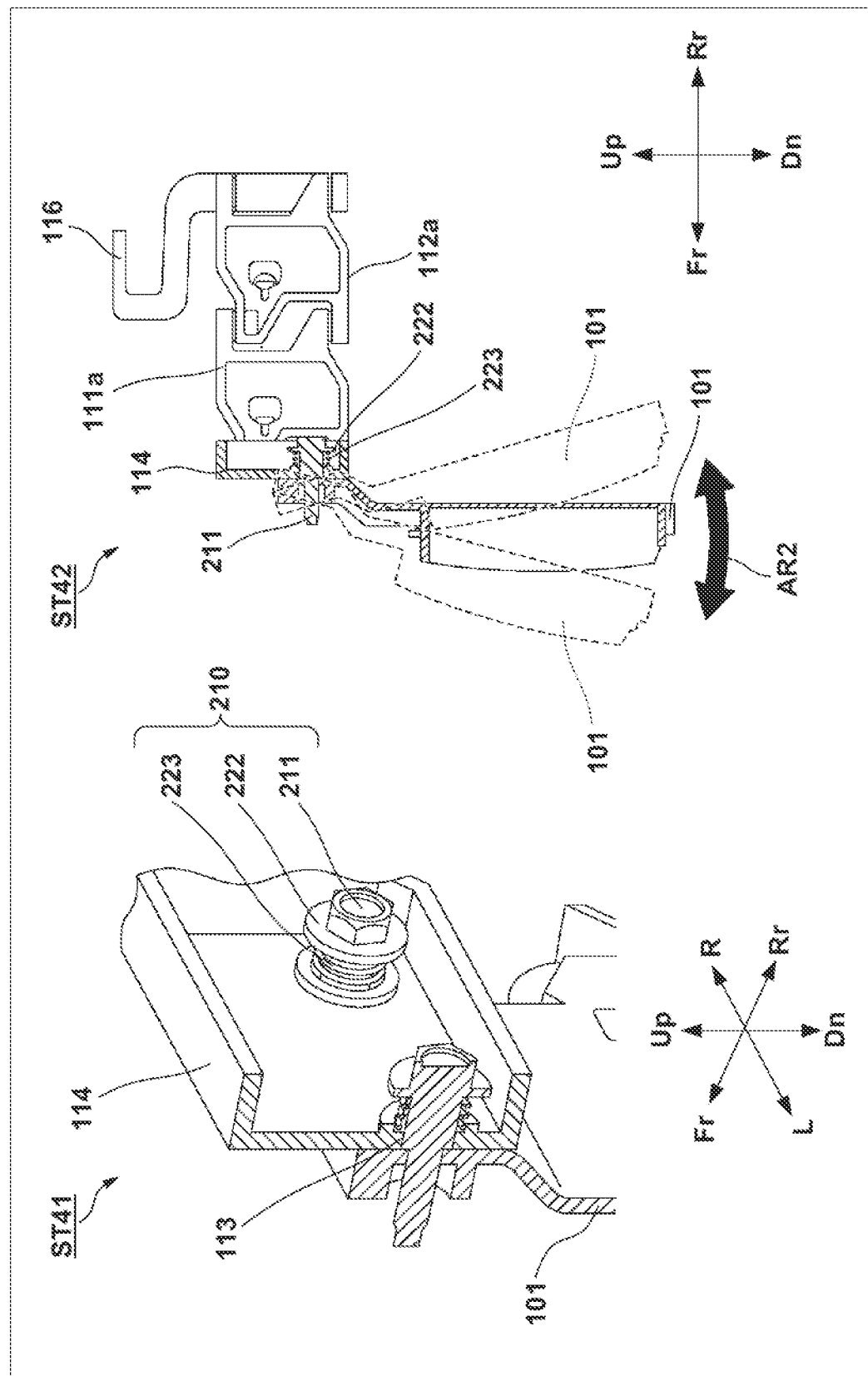
FIG. 4 is a view for explaining the structure and the operation of a second absorption mechanism.

FIG. 4 is a view for explaining the structure and the operation of the second absorption mechanism 210. ST41 is a view showing the entire second absorption mechanism 210, and ST42 is a view showing the sensor attachment structure 100 in a state (initial position) in which an external load does not act (solid lines), and swing (broken lines) of the second absorption mechanism 210 in a case in which the external load F acts on the sensor attachment structure 100.

The second absorption mechanism 210 is provided between the sensor bracket 101 and the first absorption mechanism 110. While being held by the first absorption mechanism 110, the second absorption mechanism 210 holds the sensor bracket 101 such that the sensor bracket 101 can swing from the initial position (the solid lines in ST42) in the front-and-rear direction (the direction of an arrow AR2 in FIGS. 2 and 4) of the vehicle 1 in response to the action of an external load.

As shown in ST41, the second absorption mechanism 210 includes bolts 211 (fastening members) extending through opening portions 113 of the bracket connecting member 114 of the first absorption mechanism 110 and fastened to the sensor bracket 101. Each bolt 211 is fixed by a nut 224 (ST21 in FIG. 2) from the side of the sensor bracket 101. As indicated by the solid lines in ST42, the sensor bracket 101 fastened to the bolts 211 (fastening members) is arranged on the front side of the bracket connecting member 114, supported by the shafts of the bolts 211 at the initial position, and held while being suspended on the lower side of the vehicle.

In addition, the second absorption mechanism 210 includes a washer 222 (plate-shaped member) which extends through the shaft of each bolt 211 (fastening member) and whose position is restricted at an end portion of the bolt 211, and a spring 223 (second elastic member) that is provided between the washer 222 (plate-shaped member) and the bracket connecting member 114 and biases the bracket connecting member 114 toward the sensor bracket 101 at the initial position. As shown in ST42, the sensor bracket 101 is held such that it can swing in the front-and-rear direction of the vehicle 1 due to deformation of the springs 223 (second elastic members) in response to the action of an external load.

If the sensor bracket 101 swings to the front side of the vehicle 1 by the action of the external load, the upper side of the spring 223 (second elastic member) is in a compressed state, and the lower side is in a tensile state. If the sensor bracket 101 swings to the rear side of the vehicle 1, the upper side of the spring 223 (second elastic member) is in a tensile state, and the lower side is in a compressed state. If the action of the external load is canceled, the sensor bracket 101 is returned to the position (the position indicated by the solid lines) in the initial state in ST42 by the restoring force of the spring 223 (second elastic member). This makes it possible to continuously use the sensor 3 without performing an adjusting operation such axis adjustment.

<Example of Operation>

Figure 5:
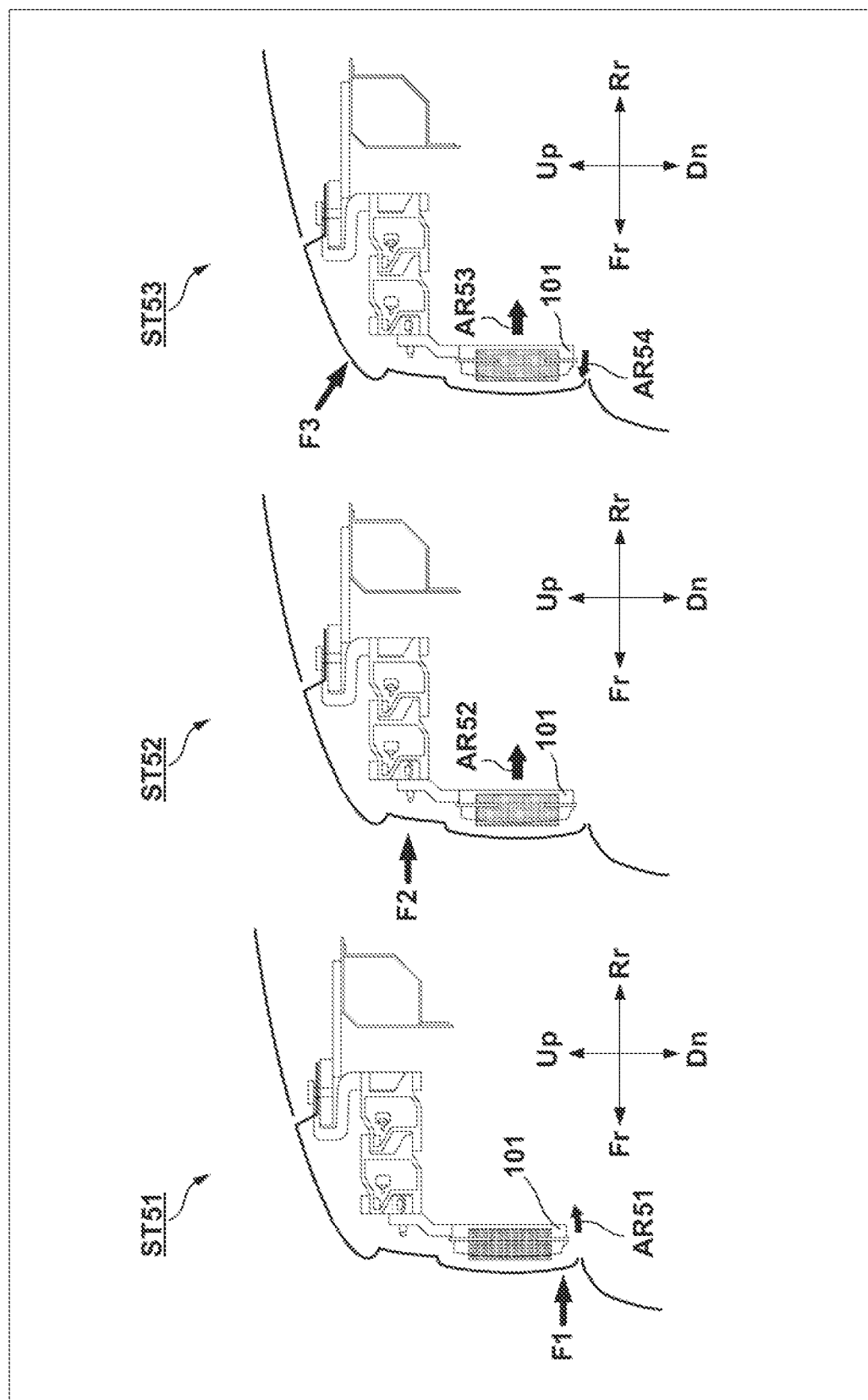
FIG. 5 is a view showing an example of the operation of the sensor attachment structure.

FIG. 5 is a view showing an example of the operation of the sensor attachment structure 100. ST51 is a view showing an example of the operation of the sensor attachment structure 100 in a case in which an external load F1 acts from the exterior member of the vehicle 1 to near the holding position of the sensor in the sensor bracket 101. ST52 is a view showing an example of the operation of the sensor attachment structure 100 in a case in which an external load F2 in the horizontal direction acts from the exterior member of the vehicle 1 to near the arrangement position of the first absorption mechanism. ST53 is a view showing an example of the operation of the sensor attachment structure 100 in a case in which an external load F3 acts obliquely from above to the exterior member of the vehicle 1.

As shown in ST51, if the external load F1 acts from the exterior member of the vehicle 1 to near the holding position of the sensor in the sensor bracket 101, the second absorption mechanism 210 described with reference to FIG. 4 makes the sensor bracket 101 swing to the rear side, as indicated by an arrow AR51, thereby absorbing the impact of the external load F1.

As shown in ST52, if the external load F2 in the horizontal direction acts from the exterior member of the vehicle 1 to near the arrangement position of the first absorption mechanism 110, the first absorption mechanism 110 described with reference to FIG. 3 makes the sensor bracket 101 retreat from the initial position (ST32 in FIG. 3) to the rear side of the vehicle 1 in response to the action of the external load F2, as indicated by an arrow AR52, thereby absorbing the impact of the external load F2.

As shown in ST53, if the external load F3 acts obliquely from above to the exterior member of the vehicle 1, the first absorption mechanism 110 makes the sensor bracket 101 retreat from the initial position (ST32 in FIG. 3) to the rear side of the vehicle 1, as indicated by an arrow AR53, thereby absorbing the impact of the external load F3. The second absorption mechanism 210 makes the sensor bracket 101 swing to the front side, as indicated by an arrow AR54, thereby absorbing the impact of the external load F3.

According to the sensor attachment structure 100 of this embodiment, the first absorption mechanism 110 or the second absorption mechanism 210 solely operates, or the first absorption mechanism 110 and the second absorption mechanism 210 complexly operate in accordance with the direction of the external load that acts, thereby absorbing the impact of the external load and protecting the sensor.

<Summary of Embodiment>

The above-described embodiment discloses the following sensor attachment structure.

Arrangement 1. A sensor attachment structure according to the above-described embodiment is a sensor attachment structure (for example, 100 in FIG. 2) in which a sensor bracket (for example, 101 in FIG. 2) that holds a sensor (for example, 3 in FIG. 2) configured to detect an external world of a moving body (for example, 1 in FIG. 1B) is attached to an exterior member (for example, 30 in FIG. 2) of the moving body (1) and a structure member (for example, 25, 26 in FIG. 2) of the moving body, comprising:

a first absorption mechanism (for example, 110 in FIG. 3) configured to hold the sensor bracket such that the sensor bracket can retreat from an initial position of the sensor bracket (101) in a state in which an external load does not act along a front-and-rear direction of the moving body in response to action of the external load; and a second absorption mechanism (for example, 210 in FIG. 4) configured to hold the sensor bracket such that the sensor bracket can swing from the initial position in response to the action of the external load, while being held by the first absorption mechanism.

Arrangement 2. In the sensor attachment structure according to the above-described embodiment, the first absorption mechanism (110) is provided between the sensor bracket (for example, 101 in FIG. 3) and the structure member (for example, 25, 26 in FIG. 2), and the second absorption mechanism (210) is provided between the sensor bracket (101) and the first absorption mechanism (110).

Arrangement 3. In the sensor attachment structure according to the above-described embodiment, the first absorption mechanism (110) includes:

a plurality of first links (for example, 111*a*, 111*b* in FIG. 3) configured to support a bracket connecting member (for example, 114 in FIG. 3) connectable to the sensor bracket;

a plurality of second links (for example, 112*a*, 112*b* in FIG. 3) configured to support the plurality of first links;

a plurality of first connecting members (for example, 117*a*, 117*b* in FIG. 3) configured to pivotally connect the plurality of first links to the plurality of second links;

a plurality of second connecting members (for example, 118*a*, 118*b* in FIG. 3) configured to pivotally connect the plurality of second links to a fixing member (for example, 116 in FIG. 3) fixed to the structure member;

a plurality of third connecting members (for example, 119*a*, 119*b* in FIG. 3) configured to pivotally connect the plurality of first links to the bracket connecting member (114); and a first elastic member (for example, 115 in FIG. 3) provided at at least one of a position between the plurality of first links and a position between the plurality of second links.

Arrangement 4. In the sensor attachment structure according to the above-described embodiment, the first elastic member (115)

biases such that an interval (for example, W1 in FIG. 3) between the plurality of first connecting members in a width direction of the moving body is held by a restoring force of the first elastic member (115) at the initial position, and the plurality of first links and the plurality of second links pivot to extend the interval (W1) in response to the action of the external load and make the sensor bracket retreat from the initial position to a rear side of the moving body, thereby absorbing the external load.

Arrangement 5. In the sensor attachment structure according to the above-described embodiment, the second absorption mechanism (210) includes a fastening member (for example, 211 in FIG. 4) extending through an opening portion (for example, 113 in FIG. 4) of the bracket connecting member (114) and fastened to the sensor bracket (101), and the sensor bracket (101) fastened to the fastening member (211) is suspended on a lower side of the moving body while being supported by a shaft of the fastening member on a front side of the bracket connecting member (114).

Arrangement 6. In the sensor attachment structure according to the above-described embodiment, the second absorption mechanism (210) further includes:

a plate-shaped member (for example, 222 in FIG. 4) which extends through a shaft of the fastening member and whose position is restricted at an end portion of the fastening member; and a second elastic member (for example, 223 in FIG. 4) provided between the plate-shaped member (222) and the bracket connecting member (114) and configured to bias the bracket connecting member (114) toward the sensor bracket (101) at the initial position, and the second absorption mechanism (210)

holds the sensor bracket (101) such that the sensor bracket can swing in the front-and-rear direction of the moving body due to deformation of the second elastic members in response to the action of the external load.

According to the sensor attachment structure of Arrangements 1 to 6, it is possible to provide a sensor attachment structure that protects a sensor by absorbing a load that the exterior member receives without being influenced by a change in the attachment accuracy caused by aging. Hence, even if the sensor bracket is attached to both the exterior member of the moving body and the structure member of the moving body, the impact of the external load can be absorbed by retreat and swing of the sensor bracket. It is therefore possible to suppress damage to the sensor and protect it.

Arrangement 7. In the sensor attachment structure according to the above-described embodiment, if the external load acts from the exterior member (30) of the moving body (1) to near a holding position of the sensor in the sensor bracket (101), the second absorption mechanism (210) makes the sensor bracket (101) swing to a rear side, thereby absorbing the external load.

Arrangement 8. In the sensor attachment structure according to the above-described embodiment, if an external load in a horizontal direction acts from the exterior member (30) of the moving body (1) to near an arrangement position of the first absorption mechanism (110), the first absorption mechanism (110) makes the sensor bracket (101) retreat from the initial position in response to the action of the external load, thereby absorbing the external load.

Arrangement 9. In the sensor attachment structure according to the above-described embodiment, if the external load acts obliquely from above to the exterior member (30) of the moving body (1), the first absorption mechanism (110) makes the sensor bracket (101) retreat from the initial position, thereby absorbing the external load, and the second absorption mechanism (210) makes the sensor bracket (101) swing to a front side, thereby absorbing the external load.

According to the sensor attachment structure of Arrangements 7 to 9, the first absorption mechanism or the second absorption mechanism solely operates, or the first absorption mechanism and the second absorption mechanism complexly operate in accordance with the direction of the external load that acts, thereby absorbing the impact of the external load and protecting the sensor.

Arrangement 10. A moving body (for example, 1 in FIG. 1B) according to the above-described embodiment is a moving body comprising:

a sensor attachment structure (for example, 100 in FIG. 2) configured to attach a sensor (for example, 3 in FIG. 2) to the moving body; and a control device (for example, COM in FIG. 1A) configured to control traveling of the moving body based on information detected by the sensor (3), wherein the sensor attachment structure is a sensor attachment structure (100) in which a sensor bracket (for example, 101 in FIG. 2) that holds the sensor configured to detect an external world of the moving body (1) is attached to an exterior member (for example, 30 in FIG. 2) of the moving body and a structure member (for example, 25, 26 in FIG. 2) of the moving body, and comprises:

a first absorption mechanism (for example, 110 in FIG. 3) configured to hold the sensor bracket such that the sensor bracket can retreat from an initial position of the sensor bracket in a state in which an external load does not act along a front-and-rear direction of the moving body in response to action of the external load; and a second absorption mechanism (for example, 210 in FIG. 4) configured to hold the sensor bracket such that the sensor bracket can swing from the initial position in response to the action of the external load, while being held by the first absorption mechanism.

According to the moving body of Arrangement 10, it is possible to provide a moving body including a sensor attachment structure that protects a sensor by absorbing a load that the exterior member receives without being influenced by a change in the attachment accuracy caused by aging.

The invention is not limited to the foregoing embodiments, and various variations/changes are possible within the spirit of the invention.

What is claimed is:

1. A sensor attachment structure in which a sensor bracket that holds a sensor configured to detect an external world of a moving body is attached to an exterior member of the moving body and a structure member of the moving body, comprising:

a first absorption mechanism configured to hold the sensor bracket such that the sensor bracket can retreat from an initial position of the sensor bracket in a state in which an external load does not act along a front-and-rear direction of the moving body in response to action of the external load; and a second absorption mechanism configured to hold the sensor bracket such that the sensor bracket can swing from the initial position in response to the action of the external load, while being held by the first absorption mechanism.

2. The structure according to claim 1, wherein the first absorption mechanism is provided between the sensor bracket and the structure member, and the second absorption mechanism is provided between the sensor bracket and the first absorption mechanism.

3. The structure according to claim 1, wherein the first absorption mechanism includes:

a plurality of first links configured to support a bracket connecting member connectable to the sensor bracket;

a plurality of second links configured to support the plurality of first links;

a plurality of first connecting members configured to pivotally connect the plurality of first links to the plurality of second links;

a plurality of second connecting members configured to pivotally connect the plurality of second links to a fixing member fixed to the structure member;

a plurality of third connecting members configured to pivotally connect the plurality of first links to the bracket connecting member; and a first elastic member provided at at least one of a position between the plurality of first links and a position between the plurality of second links.

4. The structure according to claim 3, wherein the first elastic member biases such that an interval between the plurality of first connecting members in a width direction of the moving body is held by a restoring force of the first elastic member at the initial position, and the plurality of first links and the plurality of second links pivot to extend the interval in response to the action of the external load and make the sensor bracket retreat from the initial position to a rear side of the moving body, thereby absorbing the external load.

5. The structure according to claim 1, wherein the second absorption mechanism includes a fastening member extending through an opening portion of the bracket connecting member of the first absorption mechanism and fastened to the sensor bracket, and the sensor bracket fastened to the fastening member is suspended on a lower side of the moving body while being supported by a shaft of the fastening member on a front side of the bracket connecting member.

6. The structure according to claim 5, wherein the second absorption mechanism further includes:

a plate-shaped member which extends through a shaft of the fastening member and whose position is restricted at an end portion of the fastening member; and a second elastic member provided between the plate-shaped member and the bracket connecting member and configured to bias the bracket connecting member toward the sensor bracket at the initial position, and holds the sensor bracket such that the sensor bracket can swing in the front-and-rear direction of the moving body due to deformation of the second elastic members in response to the action of the external load.

7. The structure according to claim 1, wherein if the external load acts from the exterior member of the moving body to near a holding position of the sensor in the sensor bracket, the second absorption mechanism makes the sensor bracket swing to a rear side, thereby absorbing the external load.

8. The structure according to claim 1, wherein if an external load in a horizontal direction acts from the exterior member of the moving body to near an arrangement position of the first absorption mechanism, the first absorption mechanism makes the sensor bracket retreat from the initial position in response to the action of the external load, thereby absorbing the external load.

9. The structure according to claim 1, wherein if the external load acts obliquely from above to the exterior member of the moving body,
   - the first absorption mechanism makes the sensor bracket retreat from the initial position, thereby absorbing the external load, and
   - the second absorption mechanism makes the sensor bracket swing to a front side, thereby absorbing the external load.

10. A moving body comprising:
    - a sensor attachment structure configured to attach a sensor to the moving body; and
    - a control device configured to control traveling of the moving body based on information detected by the sensor, wherein the sensor attachment structure is a sensor attachment structure in which a sensor bracket that holds the sensor configured to detect an external world of the moving body is attached to an exterior member of the moving body and a structure member of the moving body, and comprises:
    - a first absorption mechanism configured to hold the sensor bracket such that the sensor bracket can retreat from an initial position of the sensor bracket in a state in which an external load does not act along a front-and-rear direction of the moving body in response to action of the external load; and
    - a second absorption mechanism configured to hold the sensor bracket such that the sensor bracket can swing from the initial position in response to the action of the external load, while being held by the first absorption mechanism.

* * * * *